Figure 1:
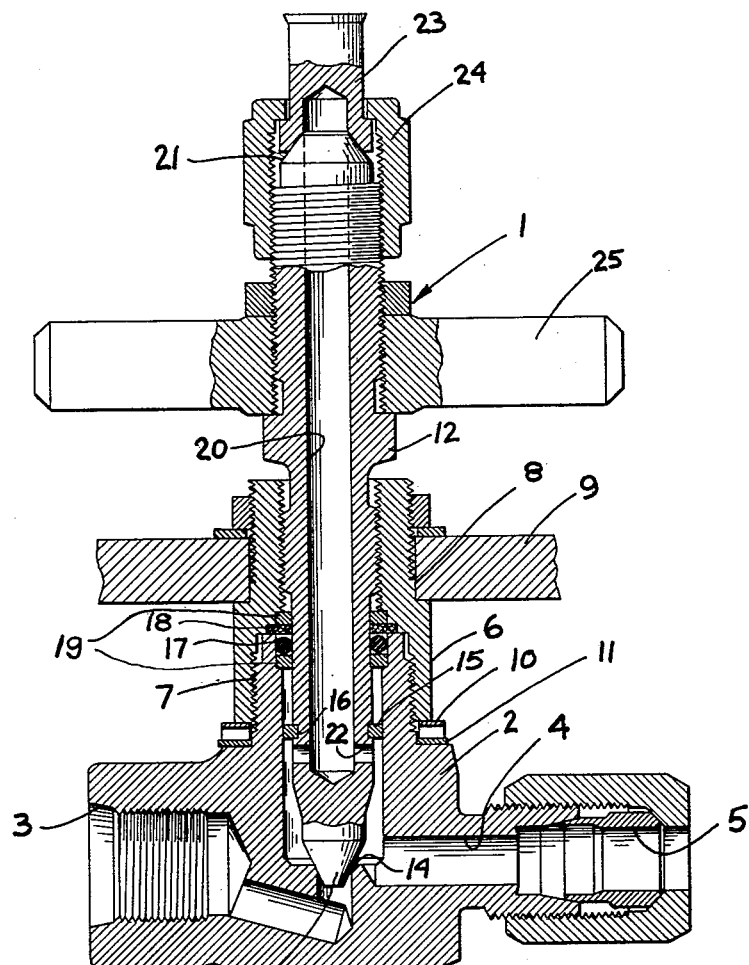

May 26, 1964     J. J. KELLY ETAL     3,134,401

GAUGE VALVE

Filed May 1, 1961

INVENTORS
Jack J. Kelly
Robert H. Reilly

BY *[signature]*

ATTORNEY

– Patented May 26, 1964

3,134,401
GAUGE VALVE
Jack J. Kelly, Waldwick, and Robert H. Reilly, Old Tappan, N.J., assignors to Hoke Incorporated, Cresskill, N.J., a corporation of New York
Filed May 1, 1961, Ser. No. 106,599
3 Claims. (Cl. 137—557)

The present invention relates to an improved valve and more particularly to a valve having a separate inlet through the valve stem to provide an alternate access path to the valve outlet.

This valve has a novel design which makes it particularly useful for applications with gauges as will be more fully described below, however, it is clear that the novel access conduit in the valve stem also makes the valve useful for a variety of other applications where it is desirable to connect into the fluid system controlled by the valve.

In most fluid, steam or gas transmission systems where pressure indicating valves are used, it is desirable that the gauge be isolated from the system by a cut-off valve. Between the cut-off valve and the gauge it is also conventional practice to place a tap. This tap is used from time to time in testing the gauge by closing the cut-off valve and by connecting a standard source of test pressure to the gauge through the tap. The provision of such a tap heretofore has required a relatively complex coupling system with several members in addition to the gauge and the gauge valve. For example, the tap itself normally consists of a T fitting having a threaded plug or outlet on one leg of the T and having suitable fixtures on the remaining legs of the T to couple it to the gauge valve and the gauge respectively. In such an installation using the tap it also is necessary to position the outlet plug of the tap so that it is readily accessible. Both the additional members required and the requirement that the tap be accessible makes these installations relatively expensive as well as space consuming.

In many modern applications for gauge valves, the complexity of the systems involved and the characteristics of the gases or the fluids being used requires the systems to be relatively compact and shielded. Where such systems are used in limited space, such as for example in submarines or in aircraft, it is essential that the systems themselves be kept within a minimum space. Also due to the complexity of many of these systems it is desirable to keep the number of members used for any particular part at a minimum. The novel valve of the present invention meets these requirements by completely eliminating the separate tap unit and by thus simplifying the connections between the gauge valve and the gauge so that no additional connecting members are required other than the coupling conduit itself between the gauge valve and the gauge. In addition, the valve of the present invention assures the accessibility of the tapping outlet for the gauge as it is positioned on the regular gauge valve stem adjacent to the gauge valve control handle. Thus, the tap outlet is positioned on an element which is normally made accessible in valve applications.

Accordingly, an object of the present invention is to provide an improved valve.

Another object of the present invention is to provide an improved gauge valve.

Another object of the present invention is to provide a valve having a separate tapping or access outlet removably connected to the valve outlet.

Another object of the present invention is to provide an improved gauge valve control system for a gauge.

Other and further objects of the invention will be obvious upon an understanding of the illustrative embodiment about to be described, or will be indicated in the appended claims, and various advantages not referred to herein will occur to one skilled in the art upon employment of the invention in practice.

Figure 2:
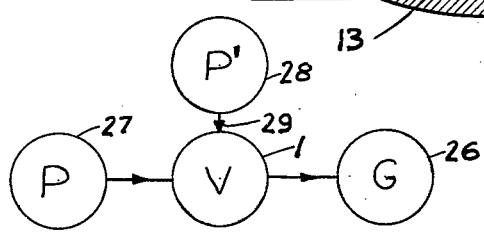

FIG. 1 is a vertical sectional view of a preferred embodiment of the valve in accordance with the present invention; and FIG. 2 is a schematic diagram of a novel system using the valve of FIG. 1.

As illustrated in FIG. 1, the valve 1 has a body portion 2 with an inlet 3 and an outlet 4. In the preferred embodiment illustrated, the outlet 4 is shown with a ferrule 5 provided to make a threadless coupling with a suitable conduit to connect the valve 1 with a gauge or other controlled members. A bonnet 6 is threadedly attached at 7 to the valve body 2 and the bonnet 6 preferably has a reduced diameter adapter portion 8 to facilitate the mounting of the valve 1 on a suitable apertured wall or mounting bracket 9. In order to lock the threaded coupling between the valve body 2 and the bonnet 6, an annular wave washer 10 is preferably positioned between the lower edge of the bonnet 6 and the valve body 2. A suitable identification tag 11 may be conveniently positioned between the wave washer 10 and the valve body 2.

A valve stem 12 having a tapered point 13 is threadably mounted in the bonnet 6 with the point 13 positioned to engage the valve seat 14 to shut off fluid flow between inlet 3 and outlet 4 in the normal manner when the valve stem 12 is turned downwardly to its closed position.

A retaining ring 15 is fitted into a suitable groove 16 in the stem 12 to limit the upward movement of the valve stem 12.

In order to seal the joint between the bonnet 6 and the valve body 2 and also to provide for a seal between the rotating valve stem 12 and the valve body 2, an O ring 17 is fitted between the stem 12 and the valve body 2 in combination with a Teflon backup ring 18 and a pair of packing rings 19.

The novel tap or access inlet in the valve 1 is provided by the conduit 20 which extends downwardly through the valve stem 12 from its upper end 21. The lower end of the conduit 20 communicates with the valve outlet 4 through a port 22. During normal operation the upper end of the conduit 20 is sealed by means of removable plug which in its preferred embodiment comprises a cap 23 and cooperating nut 24. When the cap 23 is in sealing position on valve stem 12, it will be seen that the valve 1 operates in a normal way by providing for the passage of fluid between the input 3 and the output 4 when the valve is open and by cutting off this fluid flow when the valve stem 12 is turned downwardly to its closed position.

When it is desired to obtain access to the gauge 26 (FIG. 2) independently of source 27 such as for example to connect a test pressure source 28 to the gauge 26, the valve stem 12 is turned downwardly to its closed position as illustrated in FIG. 1 and the nut 24 and cap 23 are removed. When the conduit 20 is thus opened, a temporary or semi-permanent coupling 29 may be connected thereto by using any suitable connection preferably adapted for attachment to the tapered upper end 21 of the stem 12 with or without a suitable threaded nut similar to the nut 24.

It thus can be seen that the valve of the present invention provides for ready access to a gauge or other unit coupled to the valve outlet. By providing this convenient means of coupling to the gauge, all additional connecting or coupling units are eliminated and the regular gauge valve serves a double purpose with only a few minor and inexpensive modifications. This saves valuable space and also provides for a less expensive installation while at the same time automatically insuring ready accessibility to the gauge since extra tap is eliminated and is replaced by the normally accessible valve stem 12. This method of providing access to the gauge permits the coupling conduits between the gauge and the gauge valve to remain behind a protective panel such as the panel 9 and only the valve stem 12 and the handle 25 need extend through the panel 9. This provides a cleaner and safer installation than is the case where additionl coupling and tap units are provided with their associated piping and connections to position the tap elements themselves on the exposed side of the valve mounting panel.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. In combination, a control valve and a gauge, said control valve comprising the combination of a body having spaced inlet and outlet ports, a conduit connecting said ports, a valve seat in said conduit, a valve stem having a seating portion and a sealing portion spaced therefrom, means adjustably coupling said stem to said body with said sealing portion in sealed relation to said body for controlled movement between a closed position of said stem in which said seating portion is engaged with said seat thereby closing said conduit and an open position in which said seating portion is spaced from said seat thereby opening said conduit, a conduit within said stem connecting spaced ports therein, one of said spaced ports being intermediate said seating and sealing portions of the stem and the other of said spaced ports being on the opposite side of said sealing portion from the first spaced port and outwardly of said body whereby said second named conduit is in communication with said outlet port when the stem is in either position, said coupling means being between the sealing portion and the other spaced port, a shut-off means for said other spaced port, said gauge being connected to said outlet port and continuously in communication with said second conduit, a mounting panel for said valve, and said valve being mounted on said panel with the other of said spaced ports and said gauge being on one side of said panel and said inlet and outlet ports being on the other side of said panel.

2. In combination, a control valve and a pair of gauges, said control valve comprising the combination of a body having spaced inlet and outlet ports, a conduit connecting said ports, a valve seat in said conduit, a valve stem having a seating portion and a sealing portion spaced therefrom, means adjustably coupling said stem to said body with said sealing portion in sealed relation to said body for controlled movement between a closed position of said stem in which said seating portion is engaged with said seat thereby closing said conduit and an open position in which said seating portion is spaced from said seat thereby opening said conduit, a conduit within said stem connecting spaced ports therein, one of said spaced ports being intermediate said seating and sealing portions of the stem and the other of said spaced ports being on the opposite side of said sealing portion from the first spaced port and outwardly of said body whereby said second named conduit is in communication with said outlet port when the stem is in either position, said coupling means being between the sealing portion and the other spaced port, one of said gauges being connected to said outlet port and continuously in communication with said second conduit, the other of said gauges being connected to said other port, a mounting panel for said valve, and said valve being mounted on said panel with the other of said spaced ports and said gauges being on one side of said panel and said inlet and outlet ports being on the other side of said panel.

3. A control valve comprising the combination of a body having spaced inlet and outlet ports, a conduit connecting said ports, a valve seat in said conduit, a valve stem having a seating portion and a sealing portion spaced therefrom, means adjustably coupling said stem to said body with said sealing portion in sealed relation to said body for controlled movement between a closed position of said stem in which said seating portion is engaged with said seat thereby closing said conduit and an open position in which said seating portion is spaced from said seat thereby opening said conduit, a conduit within said stem connecting spaced ports therein, one of said spaced ports being intermediate said seating and sealing portions of the stem and the other of said spaced ports being on the opposite side of said sealing portion from the first spaced port and outwardly of said body whereby said second named conduit is in communication with said outlet port when the stem is in either position, said coupling means being between the sealing portion and the other spaced port, and a shut-off means on said stem for said other spaced port.

References Cited in the file of this patent

UNITED STATES PATENTS

| | | |
|---|---|---|
| 1,099,418 | Aughenbaugh | June 9, 1914 |
| 1,200,432 | Swan | Oct. 3, 1916 |
| 1,236,372 | Hitchcock | Aug. 7, 1917 |
| 1,733,421 | Mauran | Oct. 29, 1929 |
| 1,747,598 | Popp | Feb. 18, 1930 |
| 1,912,994 | Oishei et al. | June 6, 1933 |
| 2,116,626 | Guildford | May 10, 1938 |
| 2,548,957 | Di Rosa | Apr. 17, 1951 |
| 2,631,600 | Flanagan | Mar. 17, 1953 |
| 2,636,653 | Stams | Apr. 28, 1953 |
| 2,637,331 | Sullivan | May 5, 1953 |
| 2,936,000 | Mason | May 10, 1960 |
| 2,950,895 | Anderson | Aug. 30, 1960 |
| 3,049,148 | Richardson | Aug. 14, 1962 |